(12) United States Patent
Prentice

(10) Patent No.: US 11,645,222 B1
(45) Date of Patent: May 9, 2023

(54) REAL TIME GENERATION OF DIFFERENTIAL SERIAL BUS TRAFFIC

(71) Applicant: US Gov't as represented by Sec'y of Air Force, Wright-Patterson AFB, OH (US)

(72) Inventor: David C Prentice, Springboro, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 17/572,853

(22) Filed: Jan. 11, 2022

(51) Int. Cl.
*G06F 13/42* (2006.01)
*G06F 13/16* (2006.01)

(52) U.S. Cl.
CPC ...... *G06F 13/4282* (2013.01); *G06F 13/1668* (2013.01); *G06F 2213/0002* (2013.01)

(58) Field of Classification Search
CPC . G06F 13/4286; G06F 13/4022; G06F 1/3296
See application file for complete search history.

(56) References Cited

U.S. PATENT DOCUMENTS

| | | | |
|---|---|---|---|
| 2013/0151899 A1* | 6/2013 | Wang | G06F 11/221 714/27 |
| 2017/0364471 A1* | 12/2017 | Chen | G06F 13/1673 |
| 2018/0331625 A1* | 11/2018 | Somani | H02J 7/0071 |
| 2019/0006722 A1* | 1/2019 | Kim | H02J 7/0013 |
| 2019/0068408 A1* | 2/2019 | Kamihara | H04L 25/0292 |
| 2019/0306745 A1* | 10/2019 | Kim | H04W 28/0278 |

* cited by examiner

*Primary Examiner* — Getente A Yimer
(74) *Attorney, Agent, or Firm* — AFMCLO/JAZ; Larry L. Huston

(57) ABSTRACT

Various embodiments comprise systems, mechanisms, methods and apparatus configured to regenerate or recreate a stream of substantially continuous serial bus data traffic using stored data packet sequences representing captured energy associated with inverting and non-inverting communication lines of a differential transmission line type of serial bus (e.g., RS-422, MIL STD 1553, and the like).

18 Claims, 2 Drawing Sheets

REAL TIME GENERATION OF DIFFERENTIAL SERIAL BUS TRAFFIC

ORIGIN OF THE INVENTION

The invention described herein was made by employees of the United States Government and may be manufactured and used by or for the Government of the United States of America for governmental purposes without the payment of any royalties thereon or therefore.

BACKGROUND

1. Technical Field

The present disclosure generally relates to data bus loggers and, more particularly, to generating substantially continuous serial bus data traffic representing captured energy associated with inverting and non-inverting communication lines of a differential transmission line type of serial bus such as provided by data loggers and other devices.

2. Description of the Related Art

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

U.S. Pat. No. 10,296,477 discloses a data bus logger configured to capture energy associated with a data bus and store that energy in a memory. The data bus may comprise a shared serial data bus communicating data via inverted and non-inverted differential transmission lines, such as defined by the RS-422 or MIL-STD-1553 standards. The disclosed data bus logger is electrically coupled to a data bus of interest via a bus transceiver configured to capture energy associated with each of the inverted and non-inverted differential transmission lines. The captured energy of the inverted differential transmission line is converted into a corresponding first sequence of packets of appropriate packet sizes, and the captured energy of the non-inverted differential transmission line is converted into a corresponding second sequence of packets of appropriate packet sizes. The first (inverted line energy) and second (non-inverted line energy) sequences of packets are stored in a non-volatile memory, such as a secure digital (SD) memory card or other non-volatile memory. Blocks of packets associated with the stored sequences of packets may be retrieved at a later time and decoded/processed to determine therefrom the corresponding blocks of data that had been transmitted via the serial data bus of interest.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

Figure 1:
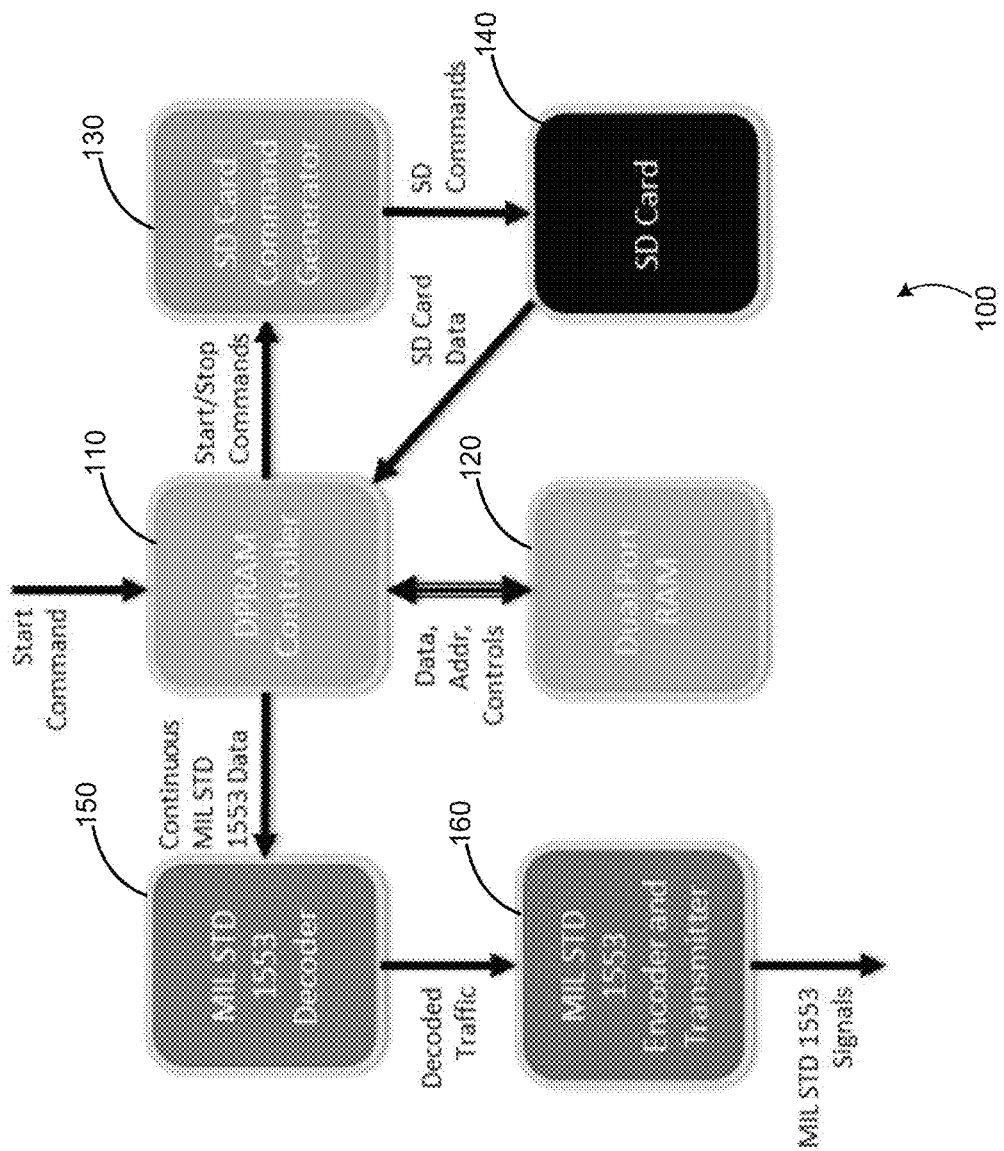
FIG. 1 depicts a block diagram of a logged data processing system according to an embodiment.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

Various deficiencies in the prior art are addressed by systems, mechanisms, methods and apparatus configured to regenerate or recreate a stream of substantially continuous serial bus data traffic using stored data packet sequences representing captured energy associated with inverting and non-inverting communication lines of a differential transmission line type of serial bus (e.g., RS-422, MIL STD 1553, and the like). The stored data packet sequences may comprise data packets stored in a secure digital (SD) device by a data logger such as disclosed in U.S. Pat. No. 10,296,477, which is incorporated herein by reference in its entirety.

The various embodiments include a method of real time generation of substantially continuous differential serial bus transmission using stored sequences of energy-representative packets, comprising: at a controller, causing a non-volatile memory to start transmitting packets from a first sequence of packets comprising data representative of energy levels of a first differential signal of a serial bus and a second sequence of packets comprising data representative of energy levels of a second differential signal of the serial bus; at the controller, receiving the transmitted packets from the first and second packet sequences and storing the received packets in a dual port random access memory (DPRAM); at the controller, retrieving the stored packets from the DPRAM and providing the retrieved packets to a decoder; at the controller, in response to DPRAM operation indicative of an approaching overflow condition, causing the non-volatile memory to stop transmitting packets from the first and second packet sequences, and in response to DPRAM operation indicative of an approaching underflow condition, causing the non-volatile memory to start transmitting packets from the first and second packet sequences; wherein the decoder is configured to decode the first and second packet sequences to retrieve thereby data traffic associated with the data packet sequences and suitable for use by a serial bus encoder/transmitter for generating a differential serial bus transmission signal representative of the data traffic.

The various embodiments include an apparatus for real time generation of a differential serial bus transmission using stored sequences of energy-representative packets, comprising: a controller, configured for causing a non-volatile memory to start transmitting packets from a first sequence of packets comprising data representative of energy levels of a first differential signal of a serial bus and a second sequence of packets comprising data representative of energy levels of a second differential signal of the serial bus; the controller further configured for receiving the transmitted packets from the first and second packet sequences and storing the received packets in a dual port random access memory (DPRAM); the controller further configured for retrieving the stored packets from the DPRAM and providing the retrieved packets to a decoder; the controller further configured for causing the non-volatile memory to stop transmitting packets from the first and second packet sequences in response to DPRAM operation indicative of an approaching overflow condition; the controller further configured for causing the non-volatile memory to start transmitting packets from the first and second packet sequences in response to DPRAM operation indicative of an approaching underflow condition; wherein the decoder is configured to decode the first and second packet sequences to retrieve thereby data traffic associated with the data packet sequences and suitable for use by a serial bus encoder/transmitter for generating a differential serial bus transmission signal representative of the data traffic.

Additional objects, advantages, and novel features of the invention will be set forth in part in the description which follows, and will become apparent to those skilled in the art upon examination of the following or may be learned by practice of the invention. The objects and advantages of the invention may be realized and attained by means of the instrumentalities and combinations particularly pointed out in the appended claims.

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Various embodiments provide systems, mechanisms, and apparatus configured to regenerate or recreate a stream of substantially continuous serial bus data traffic using stored data packet sequences representing captured energy associated with inverting and non-inverting communication lines of a differential transmission line type of serial bus (e.g., RS-422, MIL STD 1553, and the like). The stored data packet sequences may comprise data packets stored in a secure digital (SD) device by a data logger such as disclosed in U.S. Pat. No. 10,296,477, which is incorporated herein by reference in its entirety.

FIG. 1 depicts a block diagram of a logged data processing system according to an embodiment. Specifically, the logged data processing system 100 of FIG. 1 comprises a dual port random access memory (DPRAM) controller 110, a DPRAM device 120, a non-volatile memory device controller such as a SD card command generator 130, a non-volatile memory device such as a SD card 140, a serial bus decoder 150 such as a MIL STD 1553 decoder, and a serial bus encoder/transmitter 160 such as a MIL STD 1553 encoder/transmitter.

The SD card is configured to store first (differential) and second (non-differential) data packet sequences representing captured energy associated with respective inverting and non-inverting communication lines of a differential transmission line type of serial bus (e.g., RS-422, MIL STD 1553, and the like). The stored data packet sequences may comprise data packets provided by a data logger such as previously discussed with respect to U.S. Pat. No. 10,296,477.

The DPRAM controller 110 is configured to control the DPRAM device 140 via corresponding data, address, and control signal paths.

The DPRAM controller, in response to a start command received from an external device such as a computer in a forensic testing suite (not shown), issues a corresponding start commend to the SD card command generator 130 identifying a portion of the stored first (differential) and second (non-differential) data packet sequences to be retrieved for processing. The SD card command generator 130 responsively generates SD commands configured to cause the SD card 140 to begin transmitting the relevant data packet sequences as SD card data to the DPRAM controller 110. The command generator is the command interface to the SD Card. It accepts the commands from the DPRAM controller 110 and converts them into the format (such as SPI) for the SD Card.

The DPRAM controller 110 is configured to receive the relevant data packet sequences from the SD card 140 and store the data packet sequences in the DPRAM 120. In various embodiments, the DPRAM controller 110 is configured to process or reformat the received SD data into a format suitable for use by the DPRAM, such as by packing 4-bit wide SD card data into 32-bit wide DPRAM words.

The DPRAM controller 110 is configured to retrieve the relevant data packet sequences stored in the DPRAM 120 and provide the retrieved data packet sequences to the decoder 150. In various embodiments, the DPRAM controller 110 is configured to process or reformat the data packet sequences retrieved from the DPRAM 120 into a format suitable for use by the decoder 150, such as by unpacking sequences of 32-bit wide DPRAM words to provide corresponding relevant data packet sequences in a 4-bit wide format suitable for use by the decoder 150.

The start/stop commands provided by the DPRAM controller 110 are configured to enable the system 100 to retrieve SD card data and produce a substantially continuous stream of differential data without losing any stored data in the process. The process begins when a start command and total number of SD Card blocks to read is sent to the DPRAM controller 110.

In various embodiments, the DPRAM controller 110 sends a "read continuous" command to the SD Card command generator 130, which responsively causes the SD card 140 to begin transmitting SD card data to the DPRAM controller 110. This "read continuous" command does not specify a total number of blocks to read. To stop the continuous flow of data from the SD Card 140, the DPRAM controller 110 sends a "stop" command to the SD Card command generator 130, which responsively causes the SD card 140 to stop transmitting SD card data to the DPRAM controller 110.

Figure 3:
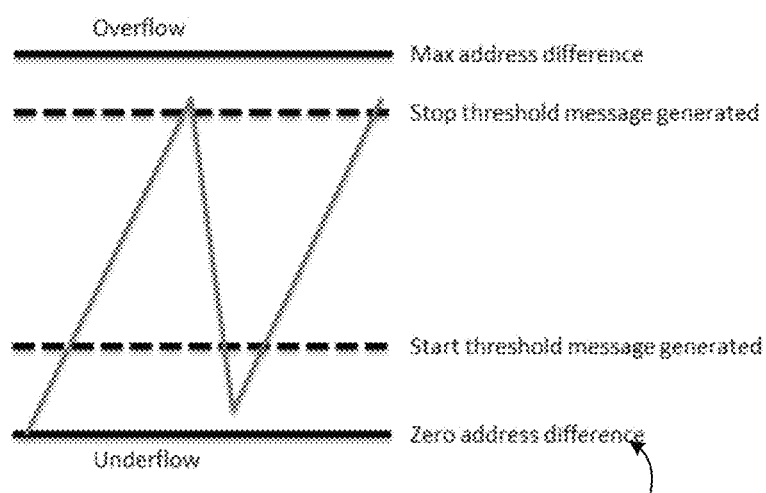
FIG. 3 graphically depicts transmission start/stop thresholds associated with a buffer overflow/underflow control mechanisms according to an embodiment.

FIG. 3 graphically depicts transmission start/stop thresholds associated with a buffer overflow/underflow control mechanisms according to an embodiment. Specifically, once the DPRAM controller 110 begins to receive data from the SD Card 140, it writes the data to the DPRAM 120 until a high address threshold is reached. This triggers the DPRAM controller 110 to send the "stop" command to the SD Card command generator 130. The high address threshold is the difference between the write and the read addresses for the DPRAM 120. The write side operates on a first clock (e.g., a 25 MHz clock) while the read side operates on a second clock (e.g., a 10 MHz clock). If the process is not controlled, the write address of the DPRAM 120 will over run the read address of the DPRAM 120, resulting in a buffer overflow error condition. Similarly, the read address of the DPRAM 120 will over run the write address of the DPRAM 120, resulting in a buffer underflow error condition, if the DPRAM controller 110 does not send another start command to the SD Card at, a low address difference threshold.

The DPRAM 120 is used as a temporary storage for the data coming from the SD Card 140. It is well suited to this task because the data being returned from the SD Card 140 may have randomly delayed return rates. The data will still be aligned with the exemplary 25 MHz clock, but the timing delay of the return data is unpredictable and may be up to 25 milliseconds. Therefore, large amounts of data need to be buffered. A dual port RAM is used to implement DPRAM 120 because data needs to be simultaneously written to the RAM and read from the RAM at the different rates. Other types of RAM allow writes or reads but not simultaneous writes and reads.

The decoder 150 is configured to decode the relevant data packet sequences provided by the DPRAM controller 110 to retrieve thereby the logged data traffic associated with the relevant data packet sequences (i.e., the serial bus data traffic transmitted on a serial bus that provided the energy used by a data logger or similar device to create the first (differential) and second (non-differential) data packet sequences representative of the serial bus data traffic). The decoded data traffic is then provided to the encoder/transmitter 160.

The encoder/transmitter 160 is configured to encode into appropriate serial bus signals the decoded traffic provided by the decoder 150, and to couple those encoded serial bus signal to the serial bus so as to effectuate transmission of the data traffic via the serial bus.

In various embodiments, after the transmitted data is retrieved from the DPRAM 120 and parsed by the DPRAM controller 110, it is provided to, e.g., a MIL-STD-1553 decoder 150 and then the encoder/transmitter 160.

This intermediate step before transmitting the data is useful to clean up the signal that was stored on the SD Card. The data stored on the SD Card is the output of MIL-STD-1553 transceivers. The high and low transition alignment of the data coming out of the transceivers is dependent on the amplitude of the incoming MIL-STD-1553 signal. Before the data can be transmitted back onto the bus, the data must be aligned or the MIL-STD-1553 transformers on the other side of the transceivers will become unbalanced. When this happens a phenomenon called tail off occurs. Tail off is when the transmitter stops sending data, but, the transformer still has energy in it. This energy will be expelled onto the bus at the end of the transmission and create an unwanted oscillating signal. The length and amplitude of this signal is dependent on the total amount of unbalanced energy left in the transformer. Therefore, the purpose of the decoder and encoder is to recreate a balanced signal that will eliminate tail off.

The various embodiments may be implemented in hardware using several techniques, including discrete devices, programmable devices, or a combination thereof. For example, various embodiments may be implemented using hardware defined via very high speed integrated circuit (VHSIC) hardware description language (VHDL) programming language, such as used within the context field programmable gate arrays (FPGA), application specific integrated circuits (ASIC), and the like. Other implementations may comprise discrete components, microcontrollers, and the like.

Figure 2:
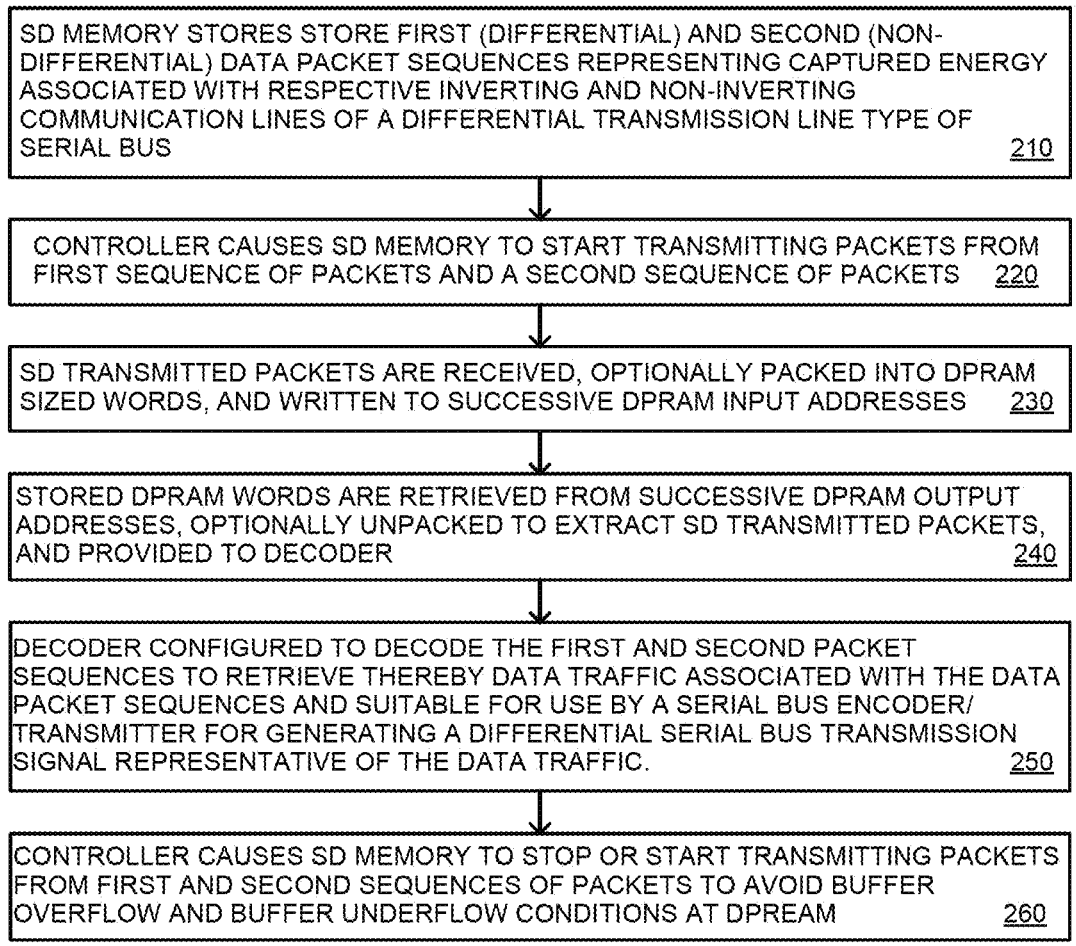
FIG. 2 depicts a method of real time generation of a differential serial bus transmission using stored sequences of energy-representative packets according to an embodiment.

FIG. 2 depicts a method of real time generation of a differential serial bus transmission using stored sequences of energy-representative packets according to an embodiment. The method 200 of FIG. 2 may be implemented in various systems, such as the systems described above with respect to FIG. 1, and is generally implemented via a DPRAM controller or similar function in a system including a DPRAM having memory space accessed via input (write or store) addresses and output (read or retrieve) addresses.

At step 210, there exists a non-volatile memory such as the SD memory 140 having stored thereon a first sequence of packets comprising data representative of energy levels of a first differential signal of a serial bus and a second sequence of packets comprising data representative of energy levels of a second differential signal of the serial bus, as previously described. That is, the SD memory stores first (differential) and second (non-differential) data packet sequences representing captured energy associated with respective inverting and non-inverting communication lines of a differential transmission line type of serial bus, such as previously described.

At step 220, a controller such as the SD RAM controller 110 causes the non-volatile memory to start transmitting packets from the first sequence of packets comprising data representative of energy levels of a first differential signal of a serial bus and the second sequence of packets comprising data representative of energy levels of a second differential signal of the serial bus.

At step 230, the controller or related entity begins/continues receiving the transmitted packets from the first and second packet sequences and storing the received packets in a dual port random access memory (DPRAM), such as via successive input addresses of DPRAM 120. The transmitted packets are packed into DPRAM sized words as appropriate.

At step 240, the controller or related entity begins/continues retrieving the stored packets from the DPRAM, such as via successive output addresses of DPRAM 120. The transmitted packets are unpacked from DPRAM sized words as appropriate. The transmitted packets retrieved from the DPRAM are provided to a decoder, such as decoder 150.

At step 250, the decoder, which is configured to decode the first and second packet sequences, operates upon the transmitted packets retrieved from the DPRAM to retrieve thereby data traffic associated with the first and second data packet sequences. The retrieved data traffic is suitable for use by a serial bus encoder/transmitter, such as encoder/transmitter 160, for generating a differential serial bus transmission signal representative of the data traffic, such as the data traffic initially retrieved from a data logger and stored in the SD card as discussed above.

At step 260, the controller monitors the current DPRAM input and output addresses to identify DPRAM operation indicative of an approaching overflow condition (e.g., difference between current input and output addresses being less than a first threshold value) or underflow condition (e.g., difference between current input and output addresses being greater than a second threshold value). In response to a threshold associated with an approaching overflow condition, the controller causes the non-volatile memory to stop transmitting packets from the first and second packet sequences. In response to a threshold associated with an approaching underflow condition the controller causes the non-volatile memory 140 to start transmitting packets from the first and second packet sequences. These conditions generally occur because the DPRAM is configured for storing packets thereto at a first rate and retrieving packets therefrom at a second rate, the second rate being slower than the first rate.

That is, given that the DPRAM is receiving/storing packets at a rate (first rate) that is faster than the rate at which packets are retrieved from the DPRAM (second rate), the difference between the first and second rates defines a time period within which the address for a stored packet may be the same as an address for a packet to be retrieved (overflow condition), or in which the address for a packet to be retrieved may not have stored therein a received packet (underflow condition). These rates of buffer filling and draining are held in approximate balance so as to avoid overflow/underflow conditions. The rates of buffer filling/draining inherently define rates of address utilization, enabling the use of address distance (number of address locations between a current input address and a current output address) to represent the time necessary to avoid overflow (i.e., first threshold) and underflow (i.e., second threshold).

In various embodiments, a threshold associated with an approaching overflow condition (e.g., a first threshold value) may be determined with respect to a fixed or calculated address difference or distance value that is large enough to allow the non-volatile memory 140, as configured and operating, enough time to stop receiving packets before an overflow condition occurs (i.e., cause the non-volatile memory to stop transmitting packets from the first and second packet sequences).

In various embodiments, a threshold associated with an approaching underflow condition (e.g., a second threshold value) may be determined with respect to a fixed or calculated address difference or distance value that is small enough to allow the non-volatile memory 140, as configured and operating, enough time to stop transmitting packets before an underflow condition occurs (i.e., cause the non-volatile memory 140 to start transmitting packets from the first and second packet sequences).

The time periods represents a number of received packets, which represents a number of addresses used. This time period, or the number of addresses to be used within this time period, may be used to as the first threshold value. The first and second threshold values may be defined by a time period or address count which further includes some margin for error, such as 10% or 20% of the time period or address count.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like. It will be appreciated that the term "or" as used herein refers to a non-exclusive "or," unless otherwise indicated (e.g., use of "or else" or "or in the alternative").

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof

What is claimed is:

1. A method of real time generation of substantially continuous differential serial bus transmission using stored sequences of energy-representative packets, comprising:

at a controller, causing a non-volatile memory to start transmitting packets from a first sequence of packets comprising data representative of energy levels of a first differential signal of a serial bus and a second sequence of packets comprising data representative of energy levels of a second differential signal of the serial bus;

at the controller, receiving the transmitted packets from the first and second packet sequences and storing the received packets in a dual port random access memory (DPRAM);

at the controller, retrieving the stored packets from the DPRAM and providing the retrieved packets to a decoder;

at the controller, in response to DPRAM operation indicative of an approaching overflow condition, causing the non-volatile memory to stop transmitting packets from the first and second packet sequences, and in response to DPRAM operation indicative of an approaching underflow condition, causing the non-volatile memory to start transmitting packets from the first and second packet sequences;

wherein the decoder is configured to decode the first and second packet sequences to retrieve thereby data traffic associated with the data packet sequences and suitable for use by a serial bus encoder/transmitter for generating a differential serial bus transmission signal representative of the data traffic;

wherein the controller is configured to determine an approaching overflow condition comprising a difference between current input and output addresses being less than a first threshold value; and wherein the first threshold value comprises a fixed address difference value that is large enough to provide sufficient time for the controller to cause the non-volatile memory to stop transmitting packets from the first and second packet sequences to avoid a buffer overflow.

2. The method of claim 1, wherein the DPRAM is configured for storing packets thereto at a first rate and retrieving packets therefrom at a second rate, the second rate being slower than the first rate.

3. The method of claim 1, wherein the controller is configured to store packets at DPRAM input addresses and retrieve packets from DPRAM output addresses, and wherein DPRAM operation indicative of an approaching overflow condition comprises a difference between current input and output addresses being less than a first threshold value.

4. The method of claim 1, wherein the first threshold value comprises the difference between the write and the read addresses for the DPRAM.

5. The method of claim 1, wherein the controller is configured to store packets at DPRAM input addresses and retrieve packets from DPRAM output addresses, and wherein DPRAM operation indicative of an underflow condition comprises a difference between current input and output addresses being greater than a second threshold value.

6. The method of claim 5, wherein the second threshold value comprises a fixed address difference that is large enough to provide sufficient time for the controller to cause the non-volatile memory to start transmitting packets from the first and second packet sequences.

7. The method of claim 1, wherein the transmitted packets from the first and second packet sequences are of a smaller bit width than a bit width of the DPRAM, and storing the received packets in the DPRAM further comprises:
packing a plurality of received packets into a word having a bit width substantially similar to that of the DPRAM; and
storing the transmitted packets from the first and second packet sequences as a sequence of packed words.

8. The method of claim 7, wherein providing the retrieved packets to the decoder further comprises:
unpacking the plurality of transmitted packets from each packet retrieved from the DPRAM, providing the unpacked packets to the decoder.

9. The method of claim 8, wherein the transmitted packets from the first and second packet sequences comprise 4-bit packets, and the bit width of the DPRAM is 32 bits.

10. Apparatus for real time generation of a differential serial bus transmission using stored sequences of energy-representative packets, comprising:
a controller, configured for causing a non-volatile memory to start transmitting packets from a first sequence of packets comprising data representative of energy levels of a first differential signal of a serial bus and a second sequence of packets comprising data representative of energy levels of a second differential signal of the serial bus;
the controller further configured for receiving the transmitted packets from the first and second packet sequences and storing the received packets in a dual port random access memory (DPRAM);
the controller further configured for retrieving the stored packets from the DPRAM and providing the retrieved packets to a decoder;
the controller further configured for causing the non-volatile memory to stop transmitting packets from the first and second packet sequences in response to DPRAM operation indicative of an approaching overflow condition;
the controller further configured for causing the non-volatile memory to start transmitting packets from the first and second packet sequences in response to DPRAM operation indicative of an approaching underflow condition;
wherein the decoder is configured to decode the first and second packet sequences to retrieve thereby data traffic associated with the data packet sequences and suitable for use by a serial bus encoder/transmitter for generating a differential serial bus transmission signal representative of the data traffic.

11. The apparatus of claim 10, wherein the DPRAM is configured for storing packets thereto at a first rate and retrieving packets therefrom at a second rate, the second rate being slower than the first rate.

12. The apparatus of claim 10, wherein the controller is configured to store packets at DPRAM input addresses and retrieve packets from DPRAM output addresses, and wherein DPRAM operation indicative of an approaching overflow condition comprises a difference between current input and output addresses being less than a first threshold value.

13. The apparatus of claim 12, wherein the first threshold value comprises a fixed address difference value that is large enough to provide sufficient time for the controller to cause the non-volatile memory to stop transmitting packets from the first and second packet sequences.

14. The apparatus of claim 10, wherein the controller is configured to store packets at DPRAM input addresses and retrieve packets from DPRAM output addresses, and wherein DPRAM operation indicative of an underflow condition comprises a difference between current input and output addresses being greater than a second threshold value.

15. The apparatus of claim 14, wherein the second threshold value comprises a fixed address difference that is large enough to provide sufficient time for the controller to cause the non-volatile memory to start transmitting packets from the first and second packet sequences.

16. The apparatus of claim 10, wherein the transmitted packets from the first and second packet sequences are of a smaller bit width than a bit width of the DPRAM, and storing the received packets in the DPRAM further comprises:
packing a plurality of received packets into a word having a bit width substantially similar to that of the DPRAM; and
storing the transmitted packets from the first and second packet sequences as a sequence of packed words.

17. The apparatus of claim 16, wherein providing the retrieved packets to the decoder further comprises:
unpacking the plurality of transmitted packets from each packet retrieved from the DPRAM, providing the unpacked packets to the decoder.

18. The apparatus of claim 17, wherein the transmitted packets from the first and second packet sequences comprise 4-bit packets, and the bit width of the DPRAM is 32 bits.

* * * * *